United States Patent
Surjan

(10) Patent No.: US 8,921,497 B2
(45) Date of Patent: *Dec. 30, 2014

(54) ADHESIVE OF EXPOXY COMPOUND, ALIPHATIC AMINE AND TERTIARY AMINE

(75) Inventor: Jim Surjan, St. Charles, IL (US)

(73) Assignee: Illinois Tool Works Inc., Glenview, IL (US)

(*) Notice: Subject to any disclaimer, the term of this patent is extended or adjusted under 35 U.S.C. 154(b) by 281 days.

This patent is subject to a terminal disclaimer.

(21) Appl. No.: 10/500,128

(22) PCT Filed: Dec. 27, 2002

(86) PCT No.: PCT/US02/41424
§ 371 (c)(1),
(2), (4) Date: Jun. 25, 2004

(87) PCT Pub. No.: WO03/057753
PCT Pub. Date: Jul. 17, 2003

(65) Prior Publication Data
US 2004/0266972 A1    Dec. 30, 2004

Related U.S. Application Data

(60) Provisional application No. 60/346,443, filed on Dec. 28, 2001.

(51) Int. Cl.
| | |
|---|---|
| *B65D 35/22* | (2006.01) |
| *C08G 59/50* | (2006.01) |
| *C08G 59/54* | (2006.01) |
| *C08G 59/56* | (2006.01) |
| *C08G 59/60* | (2006.01) |
| *C08L 63/00* | (2006.01) |
| *C08L 63/02* | (2006.01) |
| *C08L 63/04* | (2006.01) |
| *C09J 163/00* | (2006.01) |

(52) U.S. Cl.
CPC ............ *C08L 63/00* (2013.01); *C08G 59/50* (2013.01); *C08G 59/5006* (2013.01); *C09J 163/00* (2013.01)
USPC .......... 525/524; 222/94; 525/423; 525/486; 525/523; 525/527; 528/120; 528/121; 528/122; 528/123

(58) Field of Classification Search
None
See application file for complete search history.

(56) References Cited

U.S. PATENT DOCUMENTS

| | | | | | |
|---|---|---|---|---|---|
| 4,623,702 | A | * | 11/1986 | Grieves et al. | 525/528 |
| 5,681,128 | A | * | 10/1997 | Morgan et al. | 404/12 |
| 5,962,602 | A | * | 10/1999 | Hartman et al. | 525/504 |
| 6,166,849 | A | * | 12/2000 | Coleman et al. | 359/270 |
| 6,214,159 | B1 | * | 4/2001 | Armin et al. | 156/330 |
| 6,291,555 | B1 | | 9/2001 | Surjan et al. | 523/443 |
| 6,402,434 | B1 | * | 6/2002 | Surjan et al. | 405/259.5 |
| 6,403,678 | B1 | | 6/2002 | Surjan et al. | 523/211 |
| 6,416,256 | B1 | * | 7/2002 | Surjan et al. | 405/259.5 |
| 6,420,458 | B1 | * | 7/2002 | Surjan et al. | 523/443 |
| 6,572,971 | B2 | * | 6/2003 | Martin | 428/414 |
| 6,645,340 | B2 | * | 11/2003 | Gienau et al. | 156/330 |

FOREIGN PATENT DOCUMENTS

| | | | |
|---|---|---|---|
| EP | 0 488 949 | | 6/1992 |
| JP | 57-159866 A | * | 10/1982 |
| JP | 60-258277 A | * | 12/1985 |
| JP | 61-148280 A | * | 7/1986 |
| JP | 10-060089 | | 3/1998 |
| JP | 2000-154359 | | 6/2000 |
| JP | 2000-273354 A | * | 10/2000 |
| JP | 200273354 | | 10/2000 |
| JP | 2001-240837 A2 | | 4/2001 |
| JP | 2001-240837 | | 9/2001 |
| JP | 2001-240837 A | * | 9/2001 |

OTHER PUBLICATIONS

Caplus accession No. 1983:488931 for Shimbo et al., Kobunshi Rönbunshu, 1983, vol. 40, No. 7 and registry No. 124-09-4 for hexamethylenediamine, two pages.*
Caplus accession No. 1984: 492829 for Shimbo et al., Journal of Coatings Technology, 1984, vol. 56, No. 713 and registry No. 124-09-4, two pages.*
Caplus accession No. 1985:596803 for Toussaint et al., Journal of Coatings Technology, 1985, vol. 57, No. 728, one page.*
Epomate LX; 2,4,6-tetraoxaspiro[5.5]undecane-3,9-dipropanamine, LookChem, 2011, one page.*
Air Products, "Epoxy Resin Curing Agents and Additives for Adhesives and Composites," 2012, five pages.*
Chemicalland21, "Isophorone Diamine," Sep. 17, 2014, two pages.*
Dow product information, "Diethylenetriamine (DETA)," Oct. 2001, two pages.*
"Mannich Type Hardeners based on MXDA," 2014, ten pages.*

* cited by examiner

*Primary Examiner* — Robert Sellers
(74) *Attorney, Agent, or Firm* — Pauley Petersen & Erickson

(57) ABSTRACT

An adhesive for anchoring materials in or to concrete or masonry exhibits a shorter cure time than previous adhesives and comprises an epoxy compound and a curing agent of at least one aliphatic amine and at least one tertiary amine, optionally with a reactive dilent, which possesses sufficent strength to pass ICBO Heat Creep Test at 110 degrees F. and the ICBO Damp Hole Test at 75 degrees F.

25 Claims, No Drawings

ADHESIVE OF EXPOXY COMPOUND, ALIPHATIC AMINE AND TERTIARY AMINE

CROSS REFERENCE TO RELATED APPLICATIONS

This application is a U.S. national stage application based on International Application No. PCT/US02/41424, filed Dec. 27, 2002, which claims priority to U.S. Provisional Application No. 60/346,443, filed Dec. 28, 2001.

FIELD OF THE INVENTION

The present invention relates to epoxy adhesive compositions. More specifically, the invention relates to epoxy adhesive compositions that include a curing agent, also refered to as a hardener, comprising one or more amine compounds. Certain aspects of the invention relate to systems and methods for anchoring materials in or to concrete or masonry.

BACKGROUND OF THE INVENTION

Many applications require that one article, structure or item be bonded or adhered to another article, structure or item. For example, anchor bolts are employed in various fields of engineering as strengthening or reinforcing members in rock formations, or concrete or masonry structural bodies. The bolts, which are typically metallic, are inserted into holes in the rock formations, or concrete or masonry structural bodies, and are fixed or anchored therein by means of an anchor composition. Typically, the anchor composition cures or hardens (polymerizes) to form a strong bond between the rock formation, or the concrete or masonry structural body and the bolt.

It has been known to use curable synthetic resins as the primary adhesive for the safe fastening of anchoring rods, bolts and similar devices in solid rock, masonry, concrete and the like. Typically, but not exclusively, certain of the starting components of the adhesive composition are kept separate from one another and then combined at or near the point of fastening. In such so called two part systems, the components which are kept separate until the time of use are combined at the site and then introduced to the anchor bolt, the bore or hole prepared to receive the bolt, or both. Thus, the formation of the cured adhesive body that binds the fastener to the base structure is initiated at about the time the fastener is placed in its final position.

In concrete and masonry, anchor bolts are used for reinforcement. Anchor bolts are also used for attaching objects to concrete or masonry. Objects that have been attached to concrete or masonry using anchor bolts include, but are not limited to, electrical conduits, panels, piping and wall sections. Adhesive anchors are preferred over mechanical anchors for anchoring in soft concrete or masonry because adhesive anchors place less stress on the concrete or masonry. As used herein, the term "masonry" shall include, but is not limited to, stone, brick, ceramic tile, cement tile, hollow concrete block and solid concrete block.

A useful anchor composition should provide a strong bond between the concrete or masonry and the material to be anchored to the concrete or masonry, be easy to dispense at the location of use and is preferably not noxious or offensive to the user. It is also preferred that the adhesive is capable of achieving a substantial portion of its ultimate strength in a relatively short period of time. This last feature can be critically important to the commercial success of the adhesive since it can allow construction project to proceed at an efficient and profitable pace. Moreover, applicant has noted that it is desirable in many applications that the adhesive is capable of achieving good bonding properties even if it is used or applied during inclement weather or under other conditions which produce substantial moisture at the bond site.

Epoxy resins are often used as adhesives. Epoxy resins are typically one part of two-part adhesive compositions. The epoxy resin and a curing or hardening agent are typically mixed immediately prior to use, and cure within a certain amount of time. Many curing agents are nucleophilic compounds, such as amines or thiols, with at least two nucleophilic groups. Previously used amine-based curing agents often suffer from the disadvantage of producing adhesives with a relatively long cure time, particularly at relatively low temperatures. While thiol (mercaptan)-based curing agents can sometimes be formulated to react more rapidly, and at lower temperatures, than amine-based curing agents, such compounds generally produce vapors that may be noxious and/or offensive to the user's olfactory senses.

SUMMARY OF THE INVENTION

Applicant has come to appreciate a need in the art for adhesive compositions with excellent physical and processing characteristics. In view of applicant's appreciation of this need and the deficiencies in the prior art as described above, it is an object of the present invention to provide an adhesive composition that has excellent heat creep resistance and excellent damp-hole bonding properties.

One embodiment of the present invention achieves these and other objects by providing epoxy-based adhesive compositions, systems and methods that include the use of a hardener comprising amine. The composition preferably has a cure time of about two hours or less and achieves sufficient strength to pass ICBO Heat Creep Test (ICBO acceptance criteria ACS8) at 110° F. The preferred compositions of the present invention are capable also of passing the ICBO Damp Hole Test at 75° F. In highly preferred embodiments, the present compositions have at once a cure time of about two hours or less, the capability to pass ICBO Heat Creep Test and the capability to pass the ICBO Heat Damp Hole Test. The present compositions and systems also preferably are substantially free of offensive odors, as would be produced by the presence of substantial amounts of mercaptans in the formulation.

In certain preferred embodiments, the present invention provides a composition, preferably for use in systems and methods for anchoring materials in or to concrete or masonry, that comprises a first composition and a second composition that are brought together at or about the time of use. Preferably in such embodiments the first composition comprises a resin component, preferably an epoxy resin, and the second composition includes a hardening or curing agent that comprises amine. In such embodiments, the first and second compositions are brought into intimate contact to form a curable adhesive composition.

As used herein the term "cure time" refers to the time it takes from the initiation of curing reaction for the curable adhesive composition to achieve about 90% of its ultimate load capacity or strength under substantially dry conditions, with ambient temperature at about 70° F.

Although it is contemplated that excellent results can be achieved according to the broad teachings of the present invention as described herein generally, applicant has found that exceptionally surprising and unexpectedly beneficial results are obtainable from adhesive compositions comprising a difunctional liquid epoxy derived from bisphenolA/ epichlorohydrin and a curing agent comprising at least one aliphatic amine and at least one tertiary amine. Applicant has found that exceptional results can be achieved in accordance with the present invention by compositions formed from a select class of polymerizable epoxy compounds, preferably in combination with a select reactive diluent for the epoxy and a select curing agent. Furthermore, applicant has discovered that unexpectedly superior performance is possible when the polymerizable epoxy compounds are present in the adhesive compositions in amounts of from about 20 wt % to about 40 wt %, and even more preferably from about 25 wt % to about 35 wt %. Furthermore, applicants have found that unexpectedly superior results are generally achieved when the polymerizable epoxy compounds are present in the adhesive compositions in amounts of from about 70 pbwa to about 95 pbwa, and even more preferably about 85 pbwa to about 95 pbwa, wherein the term "pbwa" means part by weight based on active components. As used herein, the term "active components" refers to those components of the composition which participate in the curing of the composition, either directly as a reactant or indirectly as a catalyst, curing agent, inhibitor and the like. In certain preferred versions of such embodiments, the adhesive composition further comprises from about 0% to about 5% by weight of a reactive diluent, which may or may not constitute an epoxy compound in accordance with the present invention.

DETAILED DESCRIPTION

I. The Compositions

As mentioned previously, the preferred curable compositions in accordance with the present invention generally comprise an epoxy compound in reactive combination with a curing agent comprising one or more amine compounds.

The curable composition may be dispensed using various methods known to those skilled in the art. For example, the composition may be dispensed using a dual cartridge device similar to a caulk gun, or the composition may be dispensed using a glass or film capsule. The composition may also be dispensed in bulk from bulk containers using meter-mix equipment, which is known to those skilled in the art. See, for example, U.S. Pat. Nos. 4,651,875, 4,706,806 and 4,729,696, the disclosures of which are hereby incorporated by reference. It is recognized that the amounts of the various components of the composition may vary depending on the type of dispensing system used. In preferred dispensing methods, the curable composition is formed by the mixing of a first composition and a second composition. Typically, the mixing occurs immediately before the curable composition is to be used. For example, when the composition is dispensed using a dispensing gun, the first composition and the second composition, which are contained in separate cartridges of the dispensing gun, may be mixed as they are ejected from the cartridges and applied to the surfaces to be bonded, such as to either the concrete or masonry and/or the anchoring device in the case of anchor compositions. Similarly, when the composition is dispensed using a glass capsule, the capsule is typically comprised of two chambers that contain the first composition and the second composition respectively. When the glass capsule is crushed, the two chambers are crushed and the contents are allowed to mix, forming the anchor composition. When the anchor composition is dispersed in bulk, a first composition and a second composition may be stored in separate bulk containers and combined through pumping with mixing in the appropriate ratio to make the curable composition.

In general, the epoxy-based adhesives of the present invention comprise epoxy and amine-based curing or hardening agent for the epoxy. As used herein, the term "curing agent" refers to one or more components which are capable of catalyzing and/or accelerating the polymerization and/or crosslinking reaction of the resin component, which in preferred embodiments comprises one or more epoxy compounds.

It is contemplated that the relative proportion of epoxy to amine in the curable composition may vary widely within the scope hereof in order to accommodate the needs and requirements of any particular application. In general, however, it is preferred that the reactive composition of the present invention have a epoxy:amine weight ratio of from about 0.5:1 to about 10:1, more preferably from about 0.7:1 to about 2:1 and even more preferably from about 0.8:1 to about 1:1.

The Epoxy

As used herein, the term "epoxy compound" refers to a compound or combination of two or more compounds that contain a reactive epoxy group or oxirane ring. Such materials, broadly called epoxides, include monomeric epoxy compounds and epoxides of the polymeric type and can be aliphatic, cycloaliphatic, aromatic or heterocyclic. These materials preferably have, on the average, at least 1.5 polymerizable epoxy groups per molecule, and even more preferably two or more epoxy groups per molecule. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule. The "average" number of epoxy groups per molecule is determined by dividing the total number of epoxy groups in the epoxy-containing material by the total number of epoxy molecules present.

The epoxy-containing materials may vary from low molecular weight monomeric materials to high molecular weight polymers and may vary greatly in the nature of their backbone and substituent groups. For example, the backbone may be of any type and substituent groups thereon can be any group free of an active hydrogen atom which is reactive with an oxirane ring at room temperature. Illustrative of permissible substituent groups include halogens, ester groups, ethers, sulfonate groups, siloxane groups, nitro groups, phosphate groups, etc. The molecular weight of the epoxy-containing materials may vary from about 50 to 100,000 or more. Mixtures of various epoxy-containing materials can also be used in the compositions of this invention.

The epoxy compounds of the present invention may be cycloaliphatic epoxies. Examples of cycloaliphatic epoxides include diepoxides of cycloaliphatic esters of dicarboxylic acids such as bis(3,4-epoxycyclohexylmethyl)oxalate, bis8(3,4-epoxycyclohexylmethyl)adipate, bis(3,4-epoxy-6-methylcyclohexylmethyl)adipate, bis(3,4-epoxycyclohexylmethyl)pimelate, and the like. Other suitable diepoxides of cycloaliphatic esters of dicarboxylic acids are described in, for example, U.S. Pat. No. 2,750,395, which is incorporated herein by reference. Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyhnethyl-3,4-epoxy-1-methylcyclohexane carboxylate; 6-methyl-3,4-epoxycyclohexylmethyl-6-methyl-3,4-epoxycyclohexane carboxylate; 3,4-epoxy-2-88methylcyclohexylmethyl-3,4- epoxy-2-methylcyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate and the like. Other suitable 3,4-epoxycyclohexylmethyl-3,4-epoxycyclohexane carboxylates are described in, for example, U.S. Pat. No. 2,890,194, which is incorporated herein by reference.

There are a host of commercially available epoxy-containing materials, commonly known as epoxy resins, which can be used as the epoxy compound in this invention. In particular, epoxy compounds which are readily available include octadecylene oxide, glycidylmethacrylate, diglycidyl ether of bisphenol A (e.g., those available under the trade designations EPON 828, EPON 1004 and EPON 1010 from Shell Chemical Co., DER-331, DER-332, and DER-334, from Dow Chemical Co.), vinylcyclohexene dioxide (e.g., ERL-4206 from Union Carbide Corp.), 3,4-epoxycyclohexylmethyl-3,4-epoxycyclohexane carboxylate (e.g., ERL-4221 from Union Carbide Corp.), 3,4-epoxy-6-methylcyclohexyl-methyl-3,4-epoxy-6-methylcyclohexene carboxylate (e.g., ERL-4201 from Unio2n Carbide Corp.), bis(3,4-epoxy-6-methylcyclohexylmethyl) adipate (e.g. ERL -4289 from Union Carbide Corp.), bis(2,3-epoxycyclopentyl) ether (e.g., ERL-0400 from Union Carbide Corp.), aliphatic epoxy modified with polypropylene glycol (e.g., ERL -4050 and ERL-4052 from Union Carbide Corp.), dipentene dioxide (e.g., ERL-4269 from Union Carbide Corp.), epoxidized polybutadiene (e.g., OXIRON 2001 from FMC Corp.), silicone resin containing epoxy functionality, flame retardant epoxy resins (e.g., DER-580, a brominated bisphenol type epoxy resin available from Dow Chemical Co.), 1,4-butanediol diglycidyl ether of phenolformaldehyde novolak (e.g., DEN-431 and DEN-438 from Dow Chemical Co.), and resorcinol diglycidyl ether (e.g., KOPOXITE from Koppers Company, Inc.).

It is further contemplated that epoxy resins having a wide range of molecular weights and other characteristics are adaptable for use in accordance with the present invention. It is generally preferred, however, that the epoxy resins of the present invention possess an epoxy equivalent weight (EEW) of from about 180 to about 192. Furthermore, it is generally preferred that the epoxy resins have a viscosity of from about 11,000 to about 14,000 cps at about 25° C.

The epoxy resins suitable for use in the present invention may thus comprise one or more compounds, such as epoxy prepolymers, having more than one epoxide group per molecule available for reaction with the curing agent of the present invention. Such epoxy prepolymers include but are not limited to polyglycidyl ethers of polyvalent phenols, for example pyrocatechol, resorcinol, hydroquinone; 4,4'-dihydroxydiphenyl methane; 4,4'-dihydroxy-3-3'-dimethyldiphenyl methane; 4,4'-dihydroxydiphenyl dimethyl methane; 4,4'dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulfone; or tris-(4-hydroxyphenyl)methane; polyglycidyl ethers of novalacs (i.e., reaction products of monohydric or polyhydric phenols with aldehydes, formaldehyde in particular, in the presence of acid catalysts); polyglycidyl ethers of diphenols obtained by esterifying 2 mols of the sodium salt of an aromatic hydrocarboxylic acid with 1 mol of a dihaloalkane or dihalogen dialkyl ether; and polyglycidyl ethers of polyphenols obtained by condensing phenols and long-chain halogen paraffins containing at least two halogen atoms.

Further epoxy-containing materials which are particularly useful in the practice of this invention include glycidyl ether monomers as disclosed in U.S. Pat. No. 5,385,990, which is incorporated herein by reference.

Although it is contemplated that one or more epoxy compounds as described above may be adaptable for use within the scope of the present invention, in highly preferred embodiments the epoxy compound comprises in major proportion, and even more preferably is comprised of at least about 80% by weight of difunctional bisphenol A/epichlorohydrin derived liquid epoxy resin having a epoxide equivalent weight of from about 180 to about 200, and even more preferably from about 185 to about 195. As used herein, epoxide equivalent weight means the grams of epoxy compound or resin containing one gram equivalent of epoxide, as determined by the Shell Analytical Method HC427D-89 (perchloric acid method). Such preferred epoxy also preferably has a viscosity at 25° C. of from about 100 to about 175 poise, and even more preferably from about 110 to about 150 poise, as measured by Shell Analytical Method HC-397A-87. Such a preferred epoxy resin which satisfy these requirements is available from Shell Resins under the trade designation EPON Resin 828.

In preferred embodiments, reactive diluents are incorporated into the epoxy resin to, inter alia, control the flow characteristics of the adhesive composition. Suitable reactive diluents preferably have at least one reactive terminal end portion (including an epoxy group), and even more preferably also have a saturated or unsaturated cyclic backbone. Preferred reactive terminal ether portions include glycidyl ether and vinyl ether. Examples of suitable reactive diluents include 1,4-cyclohexane-dimethanol, the diglycidyl ether of resorcinol, diglycidyl ether of cyclohexane dimethanol, diglycidyl ether of neopentyl glycol, triglycidyl ether of trimethylolpropane dipentene, and the divinyl ether of cyclohexanedimethanol. Commercially available reactive diluents include "WC-68" from Rhone Poulenc, Epodil 741, 749 and 757 from Air Products and Chemicals Incorporated (Allentown, Pa.), Rapicure, a divinyl ether of cyclohexanedimethanol available from Allied-Signal Corp. of Morristown, N.J, and glycidyl neodeconate sold under the tradename CADURA E-10 by Shell Oil. Highly preferred for use in the epoxy resin as a reactive diluent is the 1,4 cyclohexane-dimethanol diglycidyl ether sold by Air Products under the trade designation Epodil 757.

In preferred embodiments of the present invention, the epoxy comprises, and preferably consists essentially of, epoxy resin and reactive diluent. In such embodiments, it is preferred that the epoxy resin:reactive diluent weight ratio is from about 65:10 to about 90:0.5, and even more preferably 70:5 to about 80:0.5. In highly preferred embodiments, the epoxy resin comprises about 97% by weight of epoxy (preferably EPON 828) and about 3% by weight of reactive diluent (preferably 1,4 cyclohexane-dimethanol diglycidyl ether).

The Amine Curing Agent

Although it is contemplated that, in general, the amine hardener may be any substance known as an amine-type curing agent for epoxy resins, it generally preferred that the curing agent comprise, and preferably consist essentially of, a mixture of aliphatic and tertiary amines.

In ceratin preferred embodiments, the amine(s) include, on average, greater than two hydrogen atoms active towards the epoxide resin. The amines can contain one or more primary, secondary or tertiary nitrogen atoms.

Examples of suitable amines are aliphatic, cycloaliphatic, aromatic and heterocyclic amines, such as bis-(4-aminophenyl)-methane, aniline/formaldehyde resins, benzylamine, octylamine, propane-1,3-diamine, 2,2-dimethyl-1,3-propanediamine (neopentanediamine), hexamethylenediamine, diethylenetriamine, bis(3-aminopropyl)-amine, N,N-bis(3-aminopropyl)-methylamine, triethylenetetraamine, tetraethylenepentaamine, pentaethylenehexaamine, 2,2,4-trimethylhexane-1,6-diamine, m-xylylenediamine, 1,2-and 1,4-diaminocyclohexane, bis-(4-aminocyclohexyl)-methane, bis-(4-amino-3-methylcyclohexyl)-methane, 2,2-bis-(4-aminocyclhexyl)propane and 3-aminomethyl-3,5,5-trimethylcyclohexylamine(isophoronediamine), polyaminoimidazolines and polyaminoamides, for example those obtained from aliphatic polyamines and dimerized or trimerized fatty acids. Suitable amines also include the polyoxyalkyleneamines, known as Jeffamines, made by Hunstman Chemical, for example the Jeffamines EDR 148, D 230, D 400, or T 403, xylene diamine and bis(aminocyclohexyl) methane. Other curing agents include, for example, polyamines and polyamide curing agents.

For preferred embodiments in which the curing agent comprises a combination of alipahtic and tertiary amines, it is preferred that the aliphatic:tertiary weight ratio is from about 20:9 to about 35:0.5, more preferably from about 24:3 to about 30:5, and even more preferably from about 15:1 to about 25:1. In such embodiments, it is also generally preferred that the aliphatic amine compound(s) have a glass transition temperature of from about 125° F. to about 140° F., more preferably from about 130° F. to about 135° F., and even more preferably of about 133° F., and an amine value of at least about 350 mg KOH/g, more preferably of from about 350 mg KOH/g to about 800 mg KOH/g, and even more preferably from about 450 mg KOH/g to about 700 mg KOH/g. It is also generally preferred that the tertiary amine have a amine value of from about 400 mg KOH/g to about 800 mg KOH/g, more preferably from about 500 mg KOH/g to about 700 mg KOH/g, and even more preferably from about 600 mg KOH/g to about 650 mg KOH/g.

In highly preferred embodiments the aliphatic amines of the present invention comprise a first aliphatic amine having a glass transition temperature of from about 130° F. to about 135° F. and an amine value of from about 400 mg KOH/g to about 500 mg KOH/g, and a second aliphatic amine having a glass transition temperature of from about 130° F. to about 135° F. and an amine value of at least about 550 mg KOH/g, and even more preferably of from about 550 mg KOH/g to about 700 mg KOH/g. As used herein, the "glass transition temperature" refers to the property as measured by ASTM D3418-82.

While it is contemplated that such embodiments may utilize such first and second aliphatic amines in a wide variety of relative amounts, it is generally preferred that the weight ratio of the first aliphatic amine to the second aliphatic amine is from about 1:1 to about 3:1, and more preferably of from about 1.5:1 to about 2.5:1 and even more preferably of from about 1.8:1 to about 2.1:1.

It is also contemplated that the amine curing agent may be present in a wide variety of concentration ranges within the broad scope of the present invention. Preferably, however, the present compositions comprise from about 5 wt % to about 50 wt % of amine curing agent, more preferably from about 10 wt % to about 40 wt % and even more preferably from about 10 wt % to about 20 wt %. Furthermore, applicants have found that unexpectedly superior results are generally achieved when the amine curing agent is present in the adhesive compositions in amounts of from about 20 pbwa to about 50 pbwa, and even more preferably about 30 pbwa to about 40 pbwa.

Fillers and Other Additives

The curable adhesive compositions of this invention-may also contain other additives such as fillers, pigments, diluents and dyes or the like added to provide desired properties. Suitable filler for use in the compositions of this invention are mineral fillers. Illustrative examples include: talc, mica, titanium dioxide, lithopone, zinc oxide, zirconium, silica, silica aerogel, iron dioxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cork, cotton, synthetic fibers, to name but a few. Another filler is a fumed silica which also acts as a thixotropic agent and/or a compatibalizer, such as is sold under the trade name Cab-O-Sil TS-720. Another filler for use herein comprises a mixture of alumina, silica, and iron in the form of hollow spheres, which is available under the tradename Fillite 500 sold by the Fillite division of Boliden Intertrade Inc.

The preferred amount of filler will generally depend upon the particular type of adhesive being used, contemplated dispensing method, and anticipated use, among other factors. It is preferred however, that the weight ratio of the active components (that is, the epoxy(s) plus the curing agent amine(s)) to the filler is about 0.8:1 to about 2.2:1, and even more preferably from about 0.8:1 to about 1.5:1.

Generally, the other additives such as dyes, diluents, pigments, thixotropic agents, non-reactive diluents and the like will be added in conventional amounts.

Two-Part Epoxy Adhesives

The preferred two-part epoxy adhesive comprises a first part hereinafter referred to for convenience as "Part A") comprising epoxy and a second part (hereinafter referred to for convenience as "Part B") comprising the amine-based hardener or curing agent. Filler is preferably included in one or both of Part A and Part B. In such two part embodiments, Part A preferably comprises from about 65 to about 90 PBW of epoxy resin, from about 0.5 to about 9 PBW of reactive diluent and from about 9 to about 34 PBW of filler, and even more preferably from about 70 to about 80 PBW of epoxy resin, from about 0.5 to about 5 PBW of reactive diluent and from about 15 to about 25 PBW of filler.

Part B of the two-part adhesive compositions preferably contains the amine curing agent. The preferred curing agent comprises a combination of amines, particularly Mannich bases and aliphatic amines, available under the tradename Ancamine 1856 and Ancamine 2205 sold by Air Products and Chemicals incorporated (Allentown, Pa.), and a catalyst, which is preferably a tertiary amine, particularly, 2,4,6-tri (dimethylaminomethyl)phenol, available under the tradename Ancamine K54 from Air Products and Chemicals Incorporated. According to certain preferred embodiments, Part B also comprises filler. Part B preferably comprises from about 20 to about 35 PBW of aliphatic amine, from about 0.5 to about 9 PBW of tertiary amine and from about 65 to about 80 PBW of filler, and even more preferably from about 24 to about 30 PBW of aliphatic amine, from about 0.5 to about 3 PBW of tertiary amine, and from about 65 to about 75 PBW of filler.

The amount of Part B in the present compositions is preferably about 100 parts by weight and/or by volume per 100 parts of part A.

What is claimed is:

1. A curable adhesive composition for anchoring materials in or to concrete or masonry comprising:
   a first part including an epoxy resin comprising at least one polymerizable epoxy compound; and,
   a reactive diluent incorporated into the epoxy compound, the reactive diluent having at least one reactive terminal end portion, the epoxy compound and the reactive diluent having a weight ratio of 65:10 to 90:0.5; and
   a second part including a curing agent comprising a plurality of aliphatic amines and at least one tertiary amine;

wherein said adhesive composition has an epoxy:amine weight ratio of about 0.5:1 to about 10:1 and passes the ICBO Heat Creep Test (ICBO Acceptance Criteria AC58) at 110° F. and passes the ICBO Damp Hole Test at 75° F.;

the plurality of aliphatic amines includes a first aliphatic amine having an amine value of about 400 mg KOH/g to about 500 mg KOH/g and a second aliphatic amine having an amine value greater than about 550 mg KOH/g each of the first and second aliphatic amines having a glass transition temperature of from about 130° F. to about 135° F.; and the first and second parts are contained in separate cartridges of a dispensing gun, separate chambers of a glass capsule, or separate bulk containers.

2. The curable adhesive composition of claim 1 wherein said second aliphatic amine has an amine value of about 550 mg KOH/g to about 700 mg KOH/g.

3. The curable composition of claim 1 wherein said aliphatic amines and said one or more tertiary amines are respectively present in a weight of about 15:1 to about 25:1.

4. The curable adhesive composition of claim 1 wherein said curing agent is present in an amount of about 5 to about 50 weight percent.

5. The curable adhesive composition of claim 1 wherein said curing agent is present in an amount of about 20 parts by weight of active components (pbwa) to about 50 pbwa.

6. The curable adhesive composition of claim 1 wherein said curing agent consists of said plurality of aliphatic amines and said at least one tertiary amine.

7. The curable adhesive composition of claim 1 wherein said polymerizable epoxy compound is derived from the reaction of difunctional bisphenol-A and epichlorhydrin.

8. The curable adhesive composition of claim 7 wherein said polymerizable epoxy compound has an epoxide equivalent weight of from about 180 to about 190.

9. The curable adhesive composition of claim 7 wherein said polymerizable epoxy compound is present in the adhesive composition in an amount of about 20 weight percent to about 40 weight percent.

10. The curable adhesive composition of claim 7 wherein said polymerizable epoxy compound is present in the adhesive compositions in an amount of about 70 parts by weight of active components (pbwa) to about 95 pbwa.

11. The adhesive composition of claim 1 wherein said reactive diluent is 1,4-cyclohexane-dimethanol diglycidyl ether.

12. The adhesive composition of claim 1 having a cure time of no greater than about 2.5 hours.

13. The adhesive composition of claim 1 wherein said first aliphatic amine and said second aliphatic amine are present in a weight ratio of about 1:1 to about 3:1.

14. A curable adhesive composition for anchoring materials in or to concrete or masonry comprising:

a first part including an epoxy resin comprising at least one difunctional polymerizable liquid epoxy compound; and a reactive diluent incorporated into the epoxy compound, the reactive diluent having at least one reactive terminal end portion including an epoxy group, the epoxy compound and the reactive diluent having a weight ratio of 65:10 to 90:0.5; and a second part including a curing agent comprising a plurality of aliphatic amines and at least one tertiary amine;

wherein (i) said adhesive composition has an epoxy:amine weight ratio of about 0.5:1 to about 10:1, (ii) said at least one tertiary amine has an amine value of from about 400 mg KOH/g to about 800 mg KOH/g, and iii) said plurality of aliphatic amines includes a first aliphatic amine having an amine value of about 400 mg KOH/g to about 500 mg KOH/g and a second aliphatic amine having an amine value greater than about 550 mg KOH/g, each of the first and second aliphatic amines having a glass transition temperature of from about 130° F. to about 135° F.; and the first and second parts are contained in separate cartridges of a dispensing gun, separate chambers of a glass capsule, or separate bulk containers.

15. The adhesive composition of claim 14 having a cure time of not greater than about 2 hours.

16. The curable adhesive composition of claim 15 wherein said adhesive composition has an epoxy:amine weight ratio of about 0.7:1 to about 2:1.

17. The curable adhesive composition of claim 14 wherein said second aliphatic amine has an amine value of about 550 mg KOH/g to about 700 mg KOH/g.

18. The curable composition of claim 14 wherein said aliphatic amines and said at least one tertiary amine are respectively present in a weight of about 15:1 to about 25:1.

19. The curable composition of claim 14 wherein said aliphatic amines and said at least one tertiary amine are respectively present in a weight of about 20:9 to about 35:0.5.

20. The curable adhesive composition of claim 1, wherein the reactive terminal end portion of the reactive diluent includes an epoxy group.

21. The curable adhesive composition of claim 1, wherein the reactive diluent includes a cyclic backbone.

22. The curable adhesive composition of claim 1, wherein the epoxy compound and the reactive diluent have a weight ratio in the composition of 70:5 to 80:0.5.

23. The curable adhesive composition of claim 1, wherein the epoxy compound has a viscosity of 11,000 to 14,000 centipoise at 25° C.

24. The curable adhesive composition of claim 14, wherein the reactive diluent includes a cyclic backbone.

25. The curable adhesive composition of claim 14, wherein the epoxy compound has a viscosity of 11,000 to 14,000 centipoise at 25° C.

* * * * *

UNITED STATES PATENT AND TRADEMARK OFFICE
CERTIFICATE OF CORRECTION

| | | |
|---|---|---|
| PATENT NO. | : 8,921,497 B2 | Page 1 of 1 |
| APPLICATION NO. | : 10/500128 | |
| DATED | : December 30, 2014 | |
| INVENTOR(S) | : Jim Surjan | |

It is certified that error appears in the above-identified patent and that said Letters Patent is hereby corrected as shown below:

Title Page, Item (54) and in the Specification, Column 1 Lines 1-2 replace the current title "ADHESIVE OF EXPOXY COMPOUND, ALIPHATIC AMINE AND TERTIARY AMINE" with --ADHESIVE OF EPOXY COMPOUND, ALIPHATIC AMINE AND TERTIARY AMINE--

Signed and Sealed this
Thirty-first Day of March, 2015

Michelle K. Lee
*Director of the United States Patent and Trademark Office*